US005761205A

United States Patent [19]
Dilley

[11] Patent Number: 5,761,205
[45] Date of Patent: Jun. 2, 1998

[54] LOGICAL PORT MANAGEMENT FOR A PUBLIC BRANCH EXCHANGE

[75] Inventor: Selena Dilley, San Jose, Calif.

[73] Assignee: Siemens Business Communication Systems, Inc., Santa Clara, Calif.

[21] Appl. No.: 615,943

[22] Filed: Mar. 14, 1996

[51] Int. Cl.$^6$ ................................................ H04M 3/42
[52] U.S. Cl. .............................. 370/469; 370/270; 370/390
[58] Field of Search .................................. 370/469, 524, 370/904, 390, 259, 270; 379/201

[56] References Cited

U.S. PATENT DOCUMENTS 5,621,731  4/1997  Dale et al. ...................... 370/257

OTHER PUBLICATIONS

H. J. Helgert, "Integrated Services Digital Network: Architectures, Protocols, Standards," Addison Wesley, pp. 152155, 334–337, 1991.

Primary Examiner—Douglas W. Olms
Assistant Examiner—Matthew C. Phillips

[57] ABSTRACT

An office point is connected to a central office using a plurality of basic rate interface (BRI) lines. A physical layer of the office point provides connection to the BRI lines. A second layer uses a first table for accessing terminal endpoint identifiers (TEIs) using port numbers and logical link numbers. A third layer uses a second table for accessing logical terminal number using the port numbers and the logical link numbers. The third layer also uses a third table for using logical terminal numbers to access service profile identifiers.

15 Claims, 3 Drawing Sheets

LOGICAL PORT MANAGEMENT FOR A PUBLIC BRANCH EXCHANGE

BACKGROUND

The present invention concerns phone systems and pertains to logical port management for a public branch exchange (PBX).

The BellCore National Standard 1 (NI-1) sets out a system where up to 8 terminals are supported by a single integrated services digital network (ISDN) basic rate interface (BRI). BellCore National Standard 2 (NI-2) sets out a system that requires 8 terminals be supported by a single basic rate interface (BRI). Typically, through each BRI, a central office is connected to a network terminator. The network terminator is then individually connected to each of up to eight terminals.

The central office communicates with the network terminator using the ISDN protocol, which is a layered protocol. The first layer is the physical layer. At the second layer, each terminal is identified by a port number, which indicates the BRI line, and an assigned terminal endpoint identifier (TEI). The same terminal is identified at the third layer of protocol by a service profile identifier (SPID) and an endpoint identification (Endpoint ID). At the call processing (fourth) layer, the directory number or the call appearance value identifies the terminal or device.

The BellCore National ISDN Standards (NI-1 and NI-2) allow for terminals to share directory numbers if they are configured in an electronic key telephone systems (EKTS) group. The EKTS configuration allows for call setup messages to be broadcast to each terminal in the group. The setup message will contain the endpoint ID for the terminal if the terminal is configured as an EKTS terminal.

SUMMARY OF THE INVENTION

In accordance with the preferred embodiment of the present invention, an office point is connected to a central office using a plurality of basic rate interface (BRI) lines. A physical layer of the office point provides connection to the BRI lines. A second layer uses a first table for accessing terminal endpoint identifiers (TEIs) using port numbers and logical link numbers. A third layer uses a second table for accessing logical terminal number using the port numbers and the logical link numbers. The third layer also uses a third table for using logical terminal numbers to access service profile identifiers.

In the preferred embodiment, the third layer additionally uses a fourth table for accessing endpoint identifiers (endpoint IDs) using the logical terminal numbers. The endpoint IDs each include a user identifier (user ID) assigned by a central office and a terminal identifier (TID). The TID corresponds to a logical link number.

The office point additionally includes a call processing layer. The call processing layer includes a fifth table means for accessing directory numbers using the logical terminal numbers.

In one embodiment of the present invention, link between the office point and the central office is initialized as follows. The office point sends to the central office a request for a terminal endpoint identifier (TEI). The request is sent over a first port and a first logical link. The central office sends to the office point a message assigning a first TEI number to the first port and the first logical link. The office point sends to the central office, a service profile identifier (SPID) and a terminal identifier (TID) for the first port and the first logical link. The TID is equal to a logical link number (CES) for the first logical link. The central office sends to the office point an endpoint identifier (endpoint ID). The endpoint identifier includes a user identifier (user ID) and the TID.

Within the office point, the SPID is obtained by a second layer of the office point sending to a third layer of the office point a request for the SPID and the TID. Before sending the request, the second layer places the TEI number in the first table. The third layer uses a port number and the logical link number to access a logical terminal number from the second table. The third layer then uses the logical terminal number to access the SPID and the TID from the third table.

Once the office point receives the endpoint ID, the second layer of the office point sends the endpoint ID to the third layer. The third layer records the endpoint ID in the fourth table.

In one embodiment of the present invention, the office point responds to a call associated message from a central office as follows. The office point receives a call associated message over one of the plurality of BRI lines. The call associated message is received over a first port and has a TEI. The call associated message is forwarded from the first (physical) layer to the second layer. The second layer converts the TEI in the call associated message to a logical link number. The second layer then forwards the call associated message to the third layer. The third layer converts the port number and the logical link number to a logical trunk number. The third layer then forwards the call associated message to the call processing layer.

In order to respond, the call processing layer sends a response message to the third layer. The response message includes the logical trunk number. The third layer converts the logical trunk number to the port number and the logical link number. The third layer then forwards the response message to the second layer. The second layer converts the logical link number to the TEI identifier. The second layer then forwards the response message through the first layer to the central office.

In one embodiment of the present invention, the logical trunk number is divided by two and a remainder of the division is inverted in order to obtain the logical link number. That is, if the remainder is 0, it is inverted to 1. If the remainder is 1, it is inverted to 0.

Generally, the logical terminals may be numbered from 0 to N−1 where N is the number of logical terminals. The logical trunks are then numbered from N to N+M−1, where M is the number of logical trunks. In this case, the logical trunk number is divided by a number of logical links per BRI line and a remainder of the division is used as the logical link number. Similarly, to obtain the logical trunk number, the port number is multiplied by a total number of BRI lines connected to the office point. To the result of the multiplication is added the logical link number and the number of logical terminals connected to the office point.

The present invention allows an office point to be connected to a central office using a plurality of BRI lines. The terminals connected to the office point appear to the central office as a single pool of terminals. This allows the BRI lines to act as a group of trunk facilities of a PBX. All trunks in the trunk group can be accessed by any of the terminals and the terminals appear to the central office as accessible by any of the BRI lines.

DESCRIPTION OF THE PRIOR ART

Figure 1:
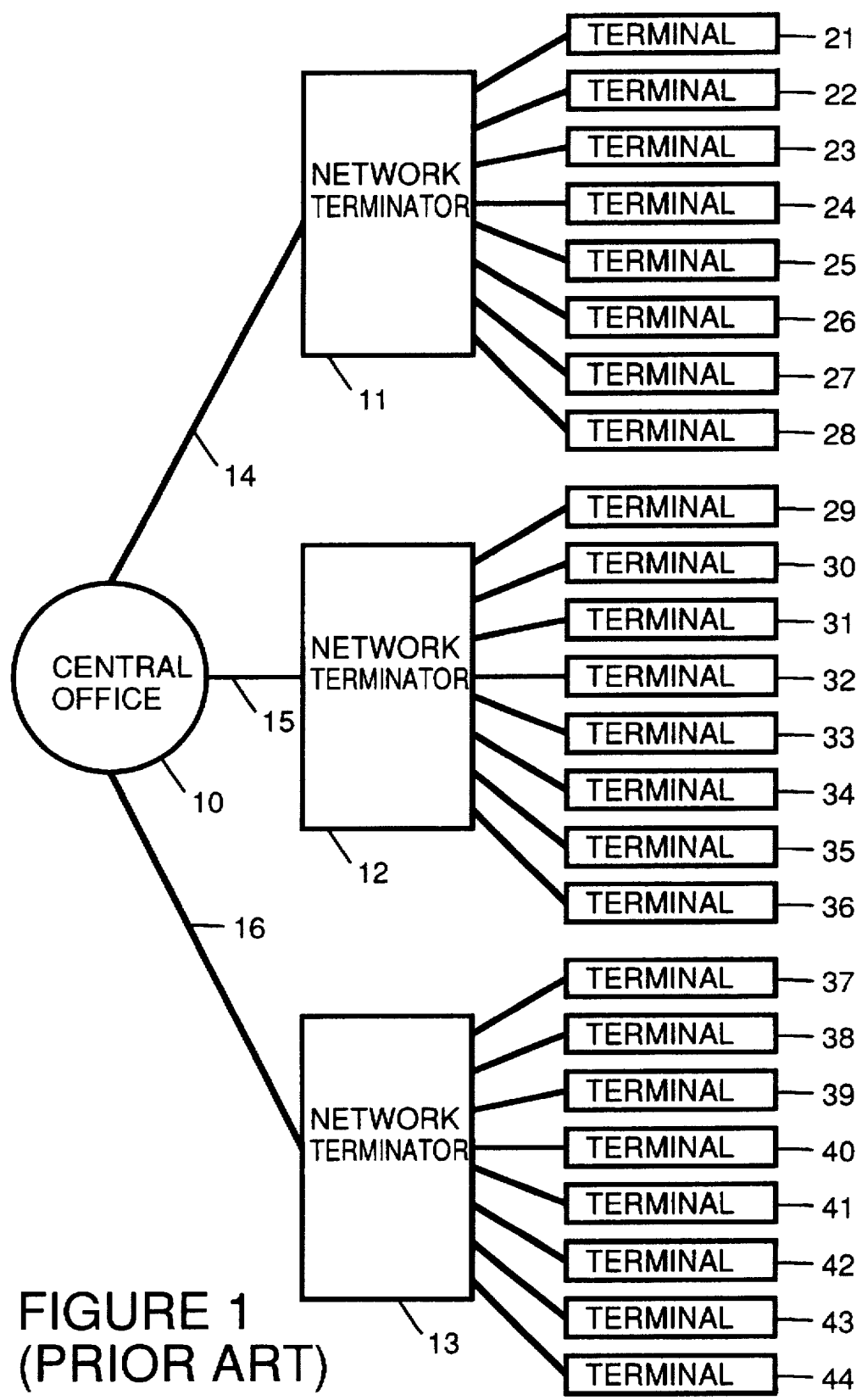
FIG. 1 shows a central office connected to a plurality of network terminators using a single basic rate interface (BRI) line for each connection in accordance with the prior art.

FIG. 1 shows a central office 10 which is connected to a network terminator 11, a network terminator 12 and a network terminator 13. Network terminator 11 is connected to central office 10 through a single integrated services digital network (ISDN) basic rate interface (BRI) line 14. Network terminator 12 is connected to central office 10 through a single BRI line 15. Network terminator 13 is connected to central office 10 through a single BRI line 16.

Each of network terminators 11, 12 and 13 is connected to up to eight terminals. For example, in FIG. 2, network terminator 11 is shown connected to a terminal 21, a terminal 22, a terminal 23, a terminal 24, a terminal 25, a terminal 26, a terminal 27 and a terminal 28. Network terminator 12 is shown connected to a terminal 29, a terminal 30, a terminal 31, a terminal 32, a terminal 33, a terminal 34, a terminal 35 and a terminal 36. Network terminator 13 is shown connected to a terminal 37, a terminal 38, a terminal 39, a terminal 40, a terminal 41, a terminal 42, a terminal 43 and a terminal 44.

Central office 10 communicates with each of network terminators 11, 12 and 13 using the ISDN protocol, which is a layered protocol. The first layer is the physical layer. At the second layer, each terminal is identified by a port number, which indicates the BRI line, and an assigned terminal endpoint identifier (TEI). The same terminal is identified at the third layer of protocol by a service profile identifier (SPID) and an endpoint identification (EI). At the call processing (fourth) layer, the directory number or the call appearance value identifies the terminal or device.

As set out above, the BellCore National ISDN Standards (NI-1 and NI-2) allows for terminals to share directory numbers if they are configured in an electronic key telephone systems (EKTS) group. The EKTS configuration allows for call setup messages to be broadcast to each terminal in the group, the setup message will contain the endpoint ID for the terminal if the terminal is configured as an EKTS terminal.

DESCRIPTION OF THE PREFERRED EMBODIMENT

Figure 2:
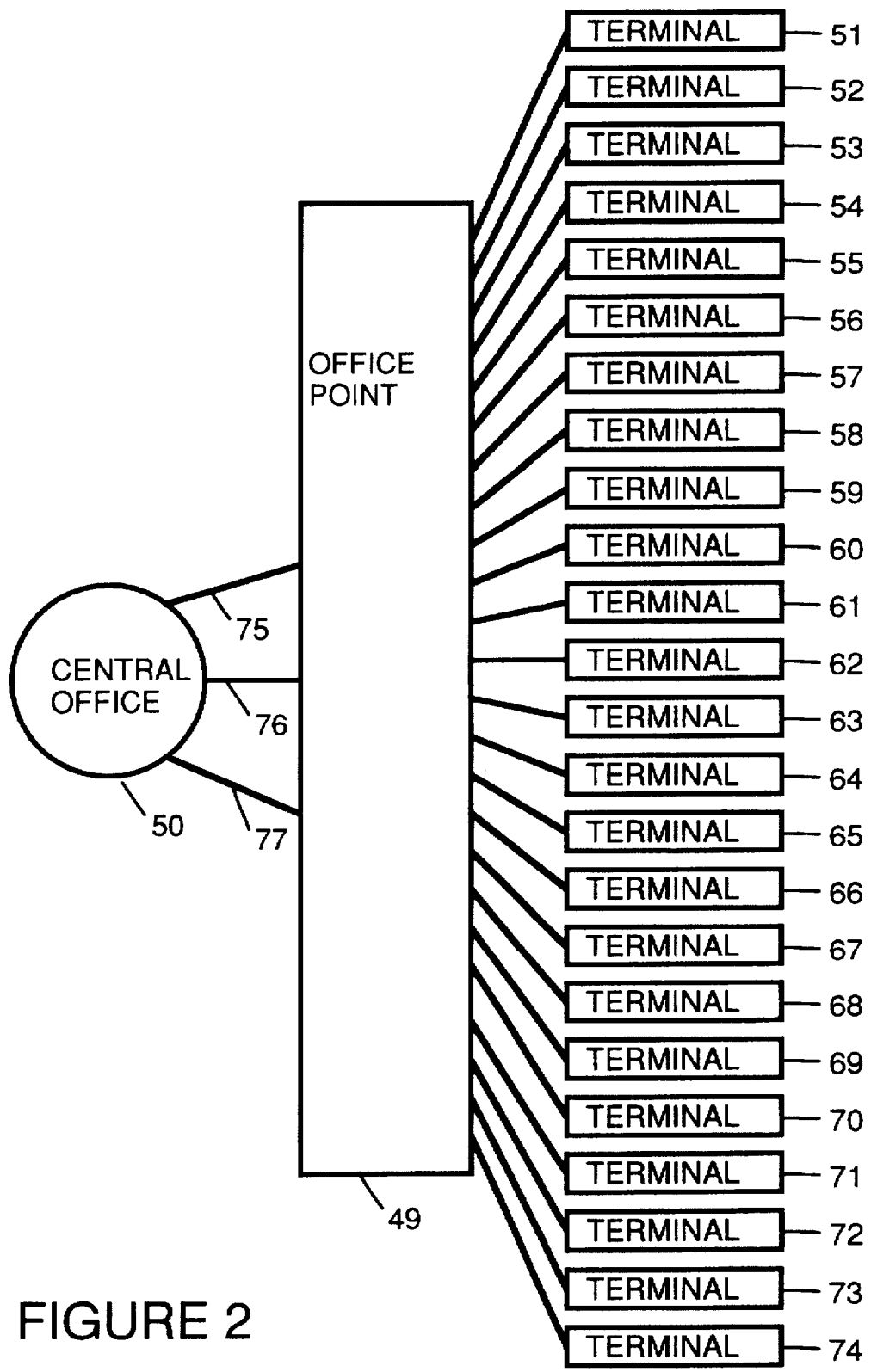
FIG. 2 shows a central office connected to an office point using a plurality of BRI lines in accordance with a preferred embodiment of the present invention.

FIG. 2 shows a central office 50 which is connected to an office point 49 through three integrated services digital network (ISDN) basic rate interface (BRI) lines: a BRI line 75, a BRI line 76 and a BRI line 77. Office point 49 is in essence a public branch exchange (PBX) which can support a mixture of 24 devices, such as video conferencing devices, faxes and so on. Office point 49 is configured with three ISDN U2b1q ports to connect with BRI lines 75, 76 and 77.

Up to twenty-four PBX terminals are connected to office point 49. For example, FIG. 2 shows office point 49 connected to a terminal 51, a terminal 52, a terminal 53, a terminal 54, a terminal 55, a terminal 56, a terminal 57, a terminal 58, a terminal 59, a terminal 60, a terminal 61, a terminal 62, a terminal 63, a terminal 64, a terminal 65, a terminal 66, a terminal 67, a terminal 68, a terminal 69, a terminal 70, a terminal 71, a terminal 72, a terminal 73 and a terminal 74.

In a first embodiment of the present invention which utilizes BellCore National ISDN Standard (NI-1), office point 49 specifies an association of two service profile identifiers (SPID) and two terminal endpoint identifiers (TEI) for each BRI line. In a second embodiment of the present invention which utilizes BellCore National ISDN Standard (NI-2), office point 49 specifies an association of eight service profile identifiers (SPID) and eight terminal endpoint identifiers (TEI) for each BRI line.

BRI lines 75, 76 and 77 are managed as a group of trunk facilities of a PBX. All trunks in the trunk group can be accessed by any of terminals 51 through 74. Thus, each of terminals 51 through 74 appears to central office 50 as accessible by any of BRI lines 75, 76 and 77. Office point 49 is implemented so that terminals 50 through 74 appear to central office 50 as a pool of twenty-four terminals, and not as three pools of eight terminals.

Figure 3:
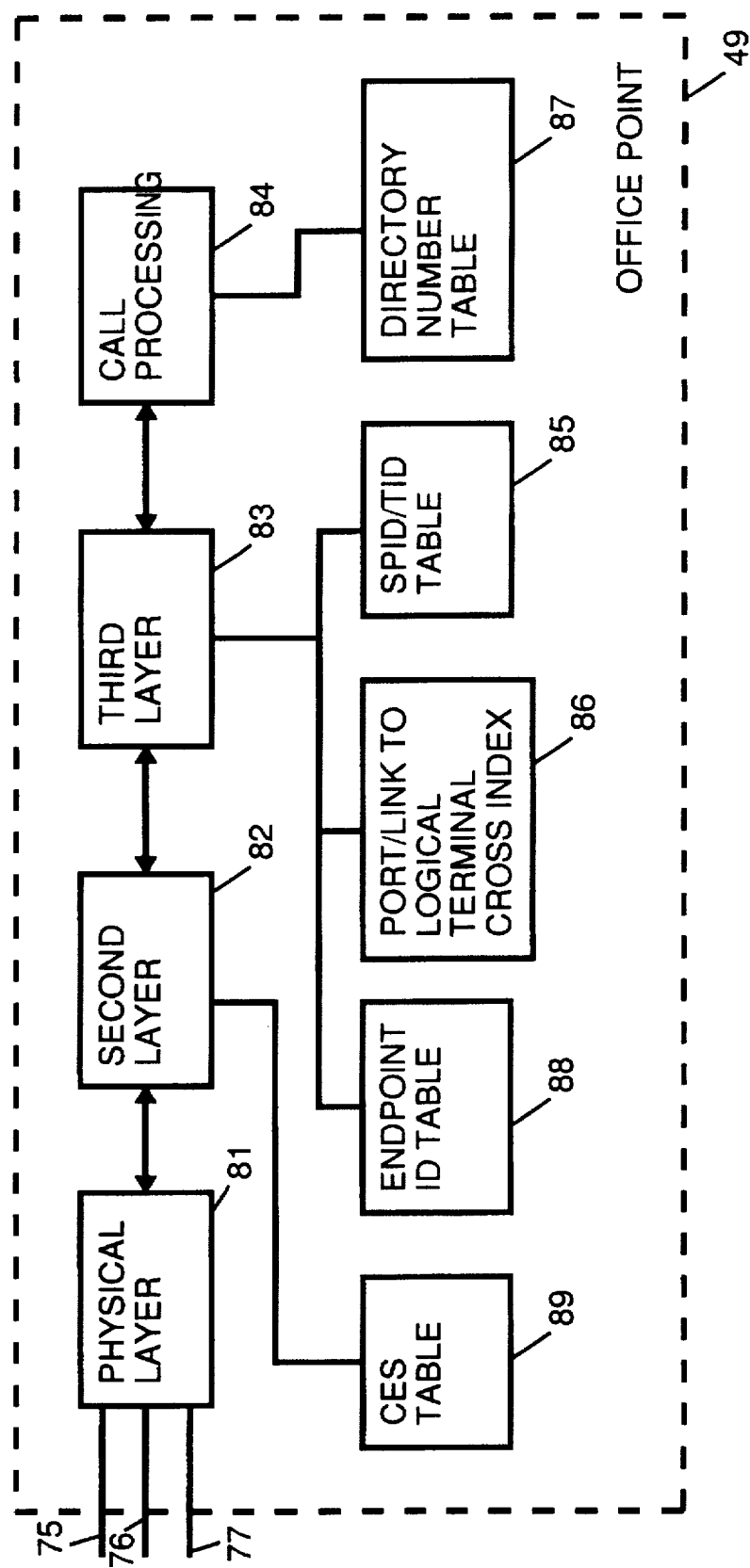
FIG. 3 is a simplified block diagram of the office point shown in FIG. 2 in accordance with a preferred embodiment of the present invention.

FIG. 3 is a simplified block diagram of office point 49. Connected to BRI lines 75, 76 and 77 is a physical layer 81. Second layer 82 handles the second layer of ISDN protocol. Third layer 83 handles the third layer of ISDN protocol. Call processing layer 84 handles the call processing layer of ISDN protocol.

Office point 49 includes a SPID/TID table 85 in which the SPID and a terminal identifier (TID) are stored for each terminal. SPID/TID table 85 is accessed by third layer 83. The range for the TID is 0 through 7 for each port (BRI line). Within SPID/TID table 85, terminals 50 through 74 are indexed as logical terminals numbered 0 through 23. A sample SPID/TID table 85 is shown in Table 1 below:

TABLE 1

| Logic Terminal Number | SPID | TID |
|---|---|---|
| 0 | 54492392500 | 00 |
| 1 | 54492253700 | 07 |
| 2 | 54492987300 | 03 |
| 3 | 54492295700 | 01 |
| 4 | | |
| . | . | . |
| . | . | . |
| 23 | 54492264300 | 06 |

For the second embodiment of the present invention which utilizes BellCore National ISDN Standard (NI-2), all twenty-four stations are assigned an SPID/TID number. For the first embodiment of the present invention which utilizes BellCore National ISDN Standard (NI-1), only six primary stations are assigned an SPID/TID number. The TID numbers for the six primary stations are either 0 or 1.

Office point 49 also includes a port/link to a logical terminal cross index table 86. The port number corresponds to the BRI line. The logical link number (CES) indicates a potential link between central office 50 and office point 49. The logical link number (CES) is used as a primitive in communications between second layer 82 and third layer 83 to identify links. Logical terminal cross index table 86 provides a cross index to SPID/TID table 85 and to an endpoint ID table 88 described more fully below. Logical terminal cross index table 86 is accessed by third layer 83. There is an entry in logical terminal cross index table 86 for each port/link.

In the preferred embodiment there are three ports (one for each of BRI lines 75, 76 and 77). There are a maximum of eight links per port. As described above, for the first embodiment of the present invention which utilizes BellCore National ISDN Standard (NI-1), only two links per port are assigned. For each port, these two links are assigned CES numbers of 0 or 1. For the second embodiment of the present invention which utilizes BellCore National ISDN Standard (NI-2), eight links per port are assigned. For each port, these two links are assigned CES numbers of 0 through 7.

Within each port/link entry, a logical terminal number is listed. This allows for the logical terminal number to be accessed using the port/link. A sample logical terminal cross index table 86 (for NI-2) is shown in Table 2 below:

TABLE 2

| Port # | CES # | Logical Terminal Number (LTN) |
|---|---|---|
| 0 | 0 | 18 |
| 0 | 1 | 07 |
| 0 | 2 | 21 |
| . | . | . |
| . | . | . |
| . | . | . |
| 0 | 7 | 06 |
| 1 | 0 | 12 |
| 1 | 1 | 09 |
| 1 | 2 | 14 |
| . | . | . |
| . | . | . |
| . | . | . |
| 1 | 7 | 03 |
| 2 | 0 | 16 |
| 2 | 1 | 19 |
| 2 | 2 | 08 |
| . | . | . |
| . | . | . |
| . | . | . |
| 2 | 7 | 05 |

Office point 49 additionally includes a directory number table 87 in which the directory number is stored for each terminal. Directory number table 87 is accessed by call processing layer 84. There is an entry in directory number table 87 for each of terminals 50 through 74. Within directory number table 87 terminals 50 through 74 are indexed as logical terminate numbered 0 through 23. A sample directory number table 87 is shown in Table 33 below:

TABLE 3

| Logic Terminal Number | Directory Number |
|---|---|
| 0 | 4923925 |
| 1 | 4922537 |
| 2 | 4929873 |
| 3 | 4922957 |
| . | . |
| . | . |
| . | . |
| 23 | 4922643 |

Office point 49 additionally includes an endpoint identification table 88 in which an endpoint identifier (endpoint ID) is stored for each terminal. The endpoint ID includes a user ID, assigned by central office 10, and a terminal identifier (TID). Endpoint (EP) identification table 88 is accessed by third layer 83. Within endpoint identification table 88, terminals 50 through 74 are indexed as logical terminals numbered 0 through 23.

The terminal ID is assigned by the system administration when the terminal is configured. During configuration, a query is made for the port for each directory number that is assigned to a terminal. The TID is appended using contiguous numbering. The last TID assigned is kept as a system value for the port. This is incremented as the directory numbers are assigned to the terminals. Logical terminal cross index table 86 is created at the same time. Third layer 83 uses logical terminal cross index table 86 to send out the SPID/TID numbers so that this forces central office 50 to receive the TID as the same value as the logical link number (CES).

As described above, for the first embodiment of the present invention which utilizes BellCore National ISDN Standard (NI-1), only two links per port are assigned. For each port, these two links are assigned TID numbers of 0 or 1. For the second embodiment of the present invention which utilizes BellCore National ISDN Standard (NI-2), eight links per port are assigned. For each port, these two links are assigned TID numbers of 0 through 7.

A sample endpoint identification table 88 (for NI-2) is shown in Table 4 below:

TABLE 4

| Logic Terminal Number | User ID | TID |
|---|---|---|
| 0 | xxxx | 00 |
| 1 | xxxx | 07 |
| 2 | xxxx | 03 |
| 3 | xxxx | 01 |
| . | . | . |
| . | . | . |
| . | . | . |
| 23 | xxxx | 06 |

Office point 49 also includes a CES table 89. CES table 89 contains terminal endpoint identifier (TEI) values as they are assigned by central office 10. CES table 89 is accessed by second layer 82. CES table 89 is accessed by port/link. In the preferred embodiment there are three ports (one for each of BRI lines 75, 76 and 77).

As described above, for the first embodiment of the present invention which utilizes BellCore National ISDN Standard (NI-1), only two links per port are assigned. For each port, these two links are assigned CES numbers of 0 or 1. For the second embodiment of the present invention which utilizes BellCore National ISDN Standard (NI-2), eight links per port are assigned. For each port, these two links are assigned CES numbers of 0 through 7.

Within CES table 89, for each port/link entry, a TEI value is listed. This allows for the TEI value to be accessed by port/link. A sample CES table 89 (for Ni-2) in Table 5 below:

TABLE 5

| PORT # | CES # | TEI Value |
|---|---|---|
| 0 | 0 | 72 |
| 0 | 1 | 65 |
| 0 | 2 | 83 |
| 0 | 3 | 78 |
| 0 | 4 | nn |
| 0 | 5 | nn |
| 0 | 6 | |
| 0 | 7 | |
| 1 | 0 | 96 |
| 1 | 1 | 67 |
| 1 | 2 | |
| 1 | 3 | |
| 1 | 4 | |
| 1 | 5 | |
| 1 | 6 | |
| 1 | 7 | |
| 2 | 0 | 84 |
| 2 | 1 | 91 |
| 2 | 2 | |
| 2 | 3 | |
| 2 | 4 | 71 |
| 2 | 5 | |
| 2 | 6 | |
| 2 | 7 | |

Initialization of second layer 82 and third layer 83 is illustrated by Table 6 below. The entries in Table 6, set out messages which result in initialization of a single TEI connection of a single BRI line between central office 50 and office point 49. Drivers within physical layer 81 are used in the transfer of messages between second layer 82 and central office 50.

TABLE 6

| Initiator | Target | Action Content |
| --- | --- | --- |
| Second layer 82 | Central office 50 | Request TEI for Port 0/Link 0 |
| Central office 50 | Second layer 82 | Assign TEI (72) |
| Second layer 82 | CES table 89 | Record Port 0/link 0 TEI is 72 |
| Second layer 82 | Third layer 83 | Request SPID/TID for Port 0/CES 0 |
| Third layer 83 | Index table 86 | Obtain LTN for Port 0/CES 0 |
| Third layer 83 | SPID/TID table 85 | Obtain SPID/TID from LTN |
| Third layer 83 | Second layer 82 | Forward SPID/TID for Port 0/CES 0 |
| Second layer 82 | CES table 89 | Obtain TEI (72) for Port 0/CES 0 |
| Second layer 82 | Central office 50 | Indicate SPID/TID for Port 0/TEI 72 |
| Central office 50 | Second layer 82 | Assign Endpoint ID for Port 0/TEI 72 |
| Second layer 82 | CES table 89 | Retrieve CES for Port 0/TEI 72 |
| Second layer 82 | Third layer 83 | Forward Endpoint ID for Port 0/CES 0 |
| Third layer 83 | Index table 86 | Obtain LTN for Port 0/CES 0 |
| Third layer 83 | EP ID table 88 | Record Endpoint ID for LTN |

The initiation process set out in Table 6 is repeated for each port number and link number. In the first embodiment of the present invention which utilizes BellCore National ISDN Standard (NI-1), office point 49 specifies an association of two service profile identifiers (SPID) and two terminal endpoint identifiers (TEI) for each BRI line. In the second embodiment of the present invention which utilizes BellCore National ISDN Standard (NI-2), office point 49 specifies an association of eight service profile identifiers (SPID) and eight terminal endpoint identifiers (TEI) for each BRI line.

For the first embodiment of the present invention, there are two TEIs assigned for each of BRI lines 75, 76 and 77. The TEIs are assigned for link (CES) 0 and link (CES) 1 of each port (BRI line). Thus all incoming calls and outgoing calls will be on logical link 0 or logical link 1 for each port (BRI line).

In order to set-up an incoming call, central office 50 will send a set-up message which is broadcast over all six links. The broadcast message uses a TEI 127. The set-up message includes an endpoint ID. When the incoming set ups are received in third layer 83, third layer 83 will check the status of the logical trunk which corresponds to the endpoint ID. If the logical trunk is in an idle state, an ALERT will be returned. When central office 50 receives the ALERT from second layer 82, the ALERT will include the port and the TEI number. If the logical trunk which corresponds to the endpoint ID is not idle, the call for this Endpoint ID will be rejected.

For call related messages, it is necessary to convert logical trunk number to a physical port/link number. This is done, for example, using an algorithm. Particularly, call processing layer 84 numbers logical terminals (stations) from 0 to 22 and logical trunks 23 through 28. When transferring messages with logical trunk numbers from call processing layer 84 to third layer 83, the CES number for the message is derived by dividing the logical trunk number (23–28) by two and inverting the remainder. That is, if the remainder is 0, it is inverted to 1. If the remainder is 1, it is inverted to 0. When transferring messages with logical trunk numbers to call processing layer 84, third layer 83, derives the logical trunk number by multiplying the port number by two, adding the CES value and adding 23.

When initiating a call related message, a first message received from central office 50 is on TEI 127 (broadcast). This message contains the Endpoint ID. Second layer 82 forwards the message to third layer 83 on a global CES (8) logical link because the specific TEI is not contained in the message. Third layer 83 finds the CES and the TEI from the endpoint ID in the message. The TID within the Endpoint ID is used to select the logical trunk to send the message to call processing layer 84, as described above. When call processing 84 responds to third layer 83, the logical trunk will be converted back to the TID/logical link (CES). Second layer 82 will use the CES to locate the TEI for the link. Second layer 82 will forward the TEI to central office 50, which will then have the correct TEI for future messages.

For non-call related messages, when communicating between call processing layer 84 and third layer 83, the TID value is used as the CES value. Non-call related messages, as received from central office 50, will include a port number and a TEI number. For example, central office 50 sends the message INFO (Message Waiting) on port 0, TEI 83 to indicate that there is a message waiting indication for TEI 83. Second layer 82 will convert the TEI to a CES (logical link) and forward the message to third layer 83. Third layer 83 will use the CES to create an Endpoint ID for call processing layer 84. Call processing layer 84, on receiving the INFO (Message Waiting), will convert the Endpoint ID to the logical terminal.

Non-call related messages, when originated by office point 49, will be converted to include a port number and a TEI number before being sent to central office 50. For example, office point sends the message INFO (Call Forwarding Feature Activation) on port 0, TEI 71 to request call feature activation of call forwarding. In order to send this message, third layer 83 converts the logical terminal number to an Endpoint ID. The Endpoint ID is then converted to logical link (CES). Second layer 82 coverts the logical link (CES) to TEI before being send to central office 50.

What is claimed is:

1. An office point comprising:
   a physical layer, the physical layer including a plurality of ports, each port for connection to a basic rate interface line;
   a second layer coupled to the physical layer, the second layer including first table means for accessing terminal endpoint identifiers (TEIs) using port numbers and logical link numbers; and,
   a third layer coupled to the second layer, the third layer including:
   second table means for accessing logical terminal number using the port numbers and the logical link numbers, and
   third table means for using logical terminal numbers to access service profile identifiers.

2. An office point as in claim 1 wherein the third layer additionally includes a fourth table means for accessing endpoint identifiers (endpoint IDs) using the logical terminal numbers.

3. An office point as in claim 2 wherein the endpoint IDs each include a user identifier (user ID) assigned by a central office and a terminal identifier (TID), the TID corresponding to a logical link number.

4. An office point as in claim 2 additionally comprising a call processing layer, the call processing layer including a fifth table means for accessing directory numbers using the logical terminal numbers.

5. A method for initializing a link between an office point and a central office, comprising the following steps:
   (a) sending, from the office point to the central office, a request for a terminal endpoint identifier (TEI), the request being sent over a first port and a first logical link;
   (b) sending, from the central office to the office point, a message assigning a first TEI number to the first port and the first logical link;
   (c) sending, from the office point to the central office, a service profile identifier (SPID) and a terminal identifier (TID) for the first port and the first logical link, the TID being equal to a logical link number (CES) for the first logical link, including the following substeps:
      (c.1) placing, by the second layer, the TEI number in a first table,
      (c.2) sending from a second layer of the office point to a third layer of the office point a request for the SPID and the TID,
      (c.3) sending the SPID and the TID from the third layer to the second layer, and
      (c.4) sending the SPID and the TID to the central office by the second layer using a first (physical) layer of the office point; and,
   (d) sending, from the central office to the office point, an endpoint identifier (endpoint ID), the endpoint identifier including a user identifier (user ID) and the TID.

6. A method as in claim 5 wherein substep (c.2) includes:
   using a port number and the logical link number to access a logical terminal number from a second table; and
   using the logical terminal number to access the SPID and the TID from a third table.

7. A method for initializing a link between an office point and a central office, comprising the following steps:
   (a) sending, from the office point to the central office, a request for a terminal endpoint identifier (TEI), the request being sent over a first port and a first logical link;
   (b) sending, from the central office to the office point, a message assigning a first TEI number to the first port and the first logical link;
   (c) sending, from the office point to the central office, a service profile identifier (SPID) and a terminal identifier (TID) for the first port and the first logical link, the TID being equal to a logical link number (CES) for the first logical link;
   (d) sending, from the central office to the office point, an endpoint identifier (endpoint ID), the endpoint identifier including a user identifier (user ID) and the TID;
   (e) sending from a second layer of the office point to a third layer of the office point the endpoint ID; and,
   (f) recording, by the third layer, the endpoint ID in a first table.

8. A method as in claim 7 wherein step (f) includes:
   obtaining, by the third layer, a logical terminal number from a second table; and,
   using the logical terminal number to place the endpoint ID in the first table.

9. A method by which an office point responds to a call associated message from a central office, the method comprising the following steps:
   (a) receiving the call associated message by the office point over one of a plurality of basic rate interface (BRI) lines, the call associated message being received over a first port and having a terminal endpoint identifier (TEI);
   (b) forwarding the call associated message from a first (physical) layer to a second layer;
   (c) converting, by the second layer, the TEI in the call associated message to a logical link number;
   (d) forwarding the call associated message from the second layer to a third layer;
   (e) converting, by the third layer, a port number and the logical link number to a logical trunk number;
   (f) forwarding the call associated message from the third layer to a call processing layer;
   (g) sending a response message from the call processing layer to the third layer, the response message including the logical trunk number;
   (h) converting, by the third layer, the logical trunk number to the port number and the logical link number, including dividing the logical trunk number by two and inverting a remainder of the division in order to obtain the logical link number;
   (i) forwarding the response message from the third layer to the second layer;
   (j) converting, by the second layer, the logical link number to the TEI; and,
   (k) forwarding, by the second layer, the response message through the first layer to the central office.

10. A method by which an office point responds to a call associated message from a central office, the method comprising the following steps:
    (a) receiving the call associated message by the office point over one of a plurality of basic rate interface (BRI) lines, the call associated message being received over a first port and having a terminal endpoint identifier (TEI);
    (b) forwarding the call associated message from a first (physical) layer to a second layer;
    (c) converting, by the second layer, the TEI in the call associated message to a logical link number;
    (d) forwarding the call associated message from the second layer to a third layer;
    (e) converting, by the third layer, a port number and the logical link number to a logical trunk number, including multiplying the port number by a total number of BRI lines connected to the office point, and adding the logical link number and a constant to the result of the multiplication in order to obtain the logical trunk number; and,
    (f) forwarding the call associated message from the third layer to a call processing layer.

11. A method as in claim 10 wherein the constant is a number of logical terminals connected to the office point.

12. A method by which a central office and an office point set up an incoming call, the method comprising the following steps:
    (a) broadcasting, by the central office, to the office point over a plurality of links between the central office and the office point, a set-up message, the set-up message including an endpoint identifier;
    (b) forwarding the set-up message from a first (physical) layer to a second layer;
    (c) forwarding for each link, by the second layer, the set-up message to a third layer;
    (d) determining, by the third layer, a logical trunk which corresponds to the endpoint identifier;
    (e) forwarding a response message from the third layer to the second layer, the response layer indicating a port number and a logical link number, the logical link number being derived by the third layer from the endpoint identifier;

(f) converting, by the second layer, the logical link number to a terminal endpoint identifier (TEI); and, (g) forwarding, by the second layer, the response message through the first layer to the central office.

13. A method as in claim 12 wherein the response message indicates whether the logical trunk is currently idle.

14. A method as in claim 12 wherein in step (a) the set-up message includes a special TEI which is reserved for broadcast messages.

15. A method by which an office point responds to a call associated message from a central office, the method comprising the following steps:

(a) receiving the call associated message by the office point over one of a plurality of basic rate interface (BRI) lines, the call associated message being received over a first port and having a terminal endpoint identifier (TEI);

(b) forwarding the call associated message from a first (physical) layer to a second layer;

(c) converting, by the second layer, the TEI in the call associated message to a logical link number;

(d) forwarding the call associated message from the second layer to a third layer;

(e) converting, by the third layer, a port number and the logical link number to a logical trunk number;

(f) forwarding the call associated message from the third layer to a call processing layer;

(g) sending a response message from the call processing layer to the third layer, the response message including the logical trunk number;

(h) converting, by the third layer, the logical trunk number to the port number and the logical link number, including dividing the logical trunk number by a number of logical links per BRI line and using a remainder of the division as the logical link number;

(i) forwarding the response message from the third layer to the second layer;

(j) converting, by the second layer, the logical link number to the TEI; and, (k) forwarding, by the second layer, the response message through the first layer to the central office.

* * * * *